United States Patent
Weinzierle et al.

(10) Patent No.: US 10,620,653 B2
(45) Date of Patent: Apr. 14, 2020

(54) MEASURING DEVICE WITH POWER MANAGEMENT

(71) Applicant: VEGA GRIESHABER KG, Wolfach (DE)

(72) Inventors: Christian Weinzierle, Wolfach (DE); Juergen Haas, Oberwolfach (DE)

(73) Assignee: VEGA GRIESHABER KG, Wolfach (DE)

( * ) Notice: Subject to any disclaimer, the term of this patent is extended or adjusted under 35 U.S.C. 154(b) by 0 days.

(21) Appl. No.: 16/377,047

(22) Filed: Apr. 5, 2019

(65) Prior Publication Data

US 2019/0310674 A1 Oct. 10, 2019

(30) Foreign Application Priority Data

Apr. 5, 2018 (DE) .................... 10 2018 205 111

(51) Int. Cl.
*G05F 1/66* (2006.01)
*G01F 23/284* (2006.01)
(Continued)

(52) U.S. Cl.
CPC .............. *G05F 1/66* (2013.01); *G01F 23/284* (2013.01); *G01L 11/00* (2013.01); *G06F 1/26* (2013.01);
(Continued)

(58) Field of Classification Search
None
See application file for complete search history.

(56) References Cited

U.S. PATENT DOCUMENTS 6,014,100 A * 1/2000 Fehrenbach .......... G01F 23/284
                                                    342/124
7,262,693 B2   8/2007 Karschnia et al.
(Continued)

FOREIGN PATENT DOCUMENTS

EP      1 174 841 A1    1/2002

OTHER PUBLICATIONS

Office Action dated Aug. 30, 2018 in German Patent Application No. 10 2018 205 111.9 (with English-language translation), 10 pgs.
(Continued)

*Primary Examiner* — Daniel S Larkin
(74) *Attorney, Agent, or Firm* — Oblon, McClelland, Maier & Neustadt, L.L.P.

(57) ABSTRACT

Described is a measuring device for determining a process measurement variable, in particular a pressure, a filling level, and/or a limit level of a medium. The measuring device has a measuring module for recording a measured value of the process measurement variable, a communication module which is configured for data transmission to a communication device, in particular for transmission of a measurement signal correlating with the measured value to the communication device, an electrical load which is supplied with electrical power by means of a supply line of the measuring device. In this case, a switching element for activating and deactivating a power supply of the electrical load is arranged in the supply line, the measuring device is configured in order, based upon the switching element, to deactivate the power supply at least during a part of a transmission time and/or at least during a part of a measurement time.

16 Claims, 2 Drawing Sheets

(51) Int. Cl.
  *G01L 11/00*    (2006.01)
  *G08C 17/02*    (2006.01)
  *G06F 1/3231*   (2019.01)
  *G06F 1/26*     (2006.01)
  *G08C 17/00*    (2006.01)
  *G06F 1/3234*   (2019.01)
  *G01F 23/00*    (2006.01)
  *H02J 7/34*     (2006.01)

(52) U.S. Cl.
  CPC .......... *G06F 1/3231* (2013.01); *G06F 1/3234* (2013.01); *G08C 17/00* (2013.01); *G08C 17/02* (2013.01); *G01F 23/00* (2013.01); *G05B 2219/25289* (2013.01); *G05B 2219/25428* (2013.01); *H02J 7/345* (2013.01)

(56) References Cited

U.S. PATENT DOCUMENTS 8,160,725 B2 *  4/2012  Allgaier ................ G06F 1/3203
                                                       455/343.1
2009/0172436 A1  7/2009  Dai et al.
2017/0228242 A1  8/2017  Rothkopf

OTHER PUBLICATIONS

ST, "Proximity and ambient light sensing (ALS) module", VL6180X, Mar. 2016, 87 pages.

* cited by examiner

MEASURING DEVICE WITH POWER MANAGEMENT

CROSS-REFERENCE TO RELATED APPLICATIONS

This application claims the benefit of the filing date of German Patent Application No. 10 2018 205 111.9, filed on 5 Apr. 2018, the entire content of which is incorporated herein by reference.

FIELD

The disclosure relates to a measuring device for determining a process measurement variable, in particular for determining a pressure, a filling level and/or a limit level of a medium and also to a method for operating such a measuring device.

BACKGROUND

In process automation, in particular in pressure measurement technology, filling level measurement technology and/or limit level measurement technology, measuring devices are used which are operated with a limited electrical supply output. In order to ensure that individual components and/or electrical loads of the measuring devices can always be supplied with sufficient electrical power, the measuring devices frequently have one or more power storage devices or power buffers. With the power stored in such power storage devices, various components and/or electrical loads can be supplied at least temporarily with sufficiently high electrical power. As a result, peaks in the power consumption of the measuring devices can be absorbed. The power storage devices used can be, for example, storage capacitors in which for instance the electrical power necessary for carrying out a measurement and/or for a data transmission, for instance a transmission of the measured values, can be stored.

BRIEF SUMMARY

One aspect of the disclosure relates to a measuring device for determining a process measurement variable such as, for example, a pressure, a filling level and/or a limit level of a medium, for instance a medium in a container. However, the measuring device according to the disclosure can also be suitable for determining any other process measurement variable. The measuring device has at least one measuring module for recording a measured value of the process measurement variable. Furthermore, the measuring device has at least one communication module which is configured for data transmission to a communication device. In particular, the communication module can be configured for transmission of a measurement signal which correlates with the measured value, for transmission of data relating to operating software and/or firmware of the measuring device and/or for transmission of parameterisation values of the measuring device. For example, the communication module can be configured for output, transmission and/or transfer of the measurement signal to the communication device. In this case, the communication device can designate a receiver such as, for example, a PC, a laptop, a smartphone, a handheld device and/or a control centre. The communication module can also be configured for receiving data, for instance from the communication device. Furthermore, the measuring device has an electrical load which is supplied with electrical power by means of a supply line of the measuring device. Furthermore, a switching element for activating and deactivating a power supply of the electrical load is arranged in the supply line of the electrical load. In other words, the power supply of the electrical load can be switched on (increased and/or activated) and/or interrupted (decreased and/or deactivated) by actuation of the switching element. In this case, the measuring device is configured in order, based upon the switching element and/or based upon an actuation of the switching element, to deactivate the power supply of the electrical load at least during a part of a transmission time in which the communication module for data transmission is active, and/or at least during a part of a measurement time in which the measuring module for detection of the measured values is active.

As a result, it is possible in an advantageous manner to omit an energy storage device, such as for example a storage capacitor, a battery and/or a capacitor, for supplying the communication module and/or the electrical load with electrical power. Consequently, such components can be relatively large and therefore occupy a significant installation space in the measuring device, for instance on a circuit board or printed circuit board. Moreover, such components can be relatively expensive. Therefore the measuring device according to the disclosure can be produced in a compact and cost-efficient manner.

Here and in the following, "activation of a power supply" and/or "activation" can mean that a delivery of electrical power is increased from a first power value to a second power value. In this case, the first power value can be zero or different from zero. Accordingly, "deactivation of the power supply" and/or "deactivation" can be a reduction of the delivery of electrical power from the second power value to the first power value.

In particular, activation of a power supply and/or activation of the communication module can mean that the communication module is provided with power for data transmission, for instance for transmission of the measurement signal.

For example, upon activation of the power supply the communication module can be switched from a standby state into a transmission state for data transmission, for instance for transmission of the measurement signal. Upon deactivation of the power supply and/or deactivation of the communication module, said module can be switched from the transmission state into the standby state. Accordingly, an activation of the power supply and/or an activation of the electrical load can also mean that the electrical load is switched from a standby state into a working state. Upon deactivation of the power supply and/or upon deactivation of the electrical load, said load can in turn be switched from the working state into the standby state. In the standby state of the communication module and/or of the electrical load it is possible to reduce a power consumption and/or energy consumption by comparison with the transmission state or the working state.

According to an embodiment, the measuring module has a radar module, also referred to as a radar front end, for transmitting a transmission signal towards the medium and for receiving a reception signal reflected on the medium, wherein the measuring device also has an evaluation circuit for determining a measurement signal based upon the reception signal, the measurement signal being correlated with the filling level and/or the limit level of the medium. The radar module can for instance be coupled to at least one antenna of the measuring device, by means of which the transmission signal can be emitted and/or the reception signal can be received. The evaluation circuit can for example be part of a control unit of the measuring device. In this case, the measurement signal can include and/or represent a measured value for the filling level. Alternatively, or in addition, the measurement signal can be representative of achievement of a limit level of the medium and/or can indicate achievement of the limit level. During the transmission time, the measurement signal can be passed on to the communication device by the communication module.

According to an embodiment, the measuring module has a pressure measurement cell for recording a pressure measurement value. Furthermore, the recorded pressure measurement value can be processed, for example, by an evaluation circuit of the measuring device, wherein the evaluation circuit can determine a measurement signal which correlates with the pressure measurement value. During the transmission time, the measurement signal can be passed on to the communication device by the communication module.

According to an embodiment, a deactivation of the power supply of the electrical load and an activation of the data transmission, for instance a measurement signal transmission, by the communication module, and/or an activation of a power supply of the communication module are synchronised with one another. Accordingly, the communication module and the electrical load can be operated and/or activated asynchronously relative to one another. In other words, it can be provided that the communication module is only activated and/or supplied with power for data transmission when the power supply of the electrical load is deactivated and/or interrupted, and vice versa. Further parts and/or components of the measuring device can be operated asynchronously in this way, in particular asynchronously relative to operation of the communication module in the transmission state, for instance since an energy consumption of the communication module during the transmission time and/or during the data transmission can be relatively high. In this way, peaks in the energy consumption of the measuring device can be avoided, so that a reliable power supply to all of the components of the measuring device can always be ensured. As a result, it is also possible to dispense with an elaborate power management of the measuring device and/ or an energy storage device.

According to an embodiment, the measuring device is configured so that the measuring module, the communication module and the electrical load are consecutively supplied with electrical power and/or activated. Alternatively or in addition, the measuring device is configured in order, upon activation of the power supply of one of the measuring module, the communication module and the electrical load, to deactivate the power supply of the respective other one of the measuring module, the communication module and the electrical load. Individual components of the measuring device, in particular the measuring module (for instance a radar module and/or a pressure measurement cell of the measuring module), the communication module and the electrical load, can be successively operated, activated and/ or supplied with power, for instance analogously to a round-robin method. For example, in order to carry out a measurement the measuring module, the radar module and/or the pressure measurement cell can be supplied with power during the measurement time, wherein the power supply of the communication module and/or of the electrical load can be deactivated during the measurement. After the measurement, the power supply of the measuring module, the radar module and/or the pressure measurement cell can be interrupted (or decreased) and the power supply of the communication module can be activated (or increased), in order to output and/or to transmit the measurement signal. The power supply of the electrical load and/or of the measuring module can then be deactivated during at least a part of the transmission time for data transmission and/or for output of the measurement signal. After output of the measurement signal, the power supply of the electrical load can be activated, wherein the power supply of the communication module and/or the measuring module can be deactivated. Thus it can be provided that always only the power supply of one of the measuring module, the communication module and the electrical load is activated. As a result, it is possible to avoid large peaks in the power supply which can occur when a plurality of the aforementioned components are operated simultaneously.

According to an embodiment, the switching element is actuated based upon a status signal of the communication module. The communication module can for instance output the status signal. The status signal can indicate an activation or a deactivation of the communication module. Accordingly, the status signal can be representative and/or indicative of an operational state, for instance the standby state and/or the transmission state, of the communication module. The switching element can be actuated directly with the status signal. Accordingly, the status signal can trigger and/or initiate the actuation of the switching element. Alternatively or in addition, the measuring device has a control unit which is configured to actuate the switching element. The control unit can for instance monitor the operational state of the communication module, for example based upon the status signal, and/or can be configured to determine the operational state of the communication module, for instance the standby state and/or the transmission state. The control unit can be configured to actuate the switching element and/or to deactivate the power supply of the electrical load when the communication module is switched into the transmission state.

According to an embodiment, the communication module is configured for wireless data transmission, for instance for wireless transmission of the measurement signal. Alternatively or in addition, the communication module has a Bluetooth module, a wireless module, an infrared module and/or a WLAN module. In particular in the case of wireless data transmission, an increased energy consumption of the communication module can occur during the transmission time. By deactivation of the electrical load during at least a part of the transmission time, the communication module can therefore be reliably supplied with power, so that a reliable and fast data transmission, in particular a transmission of the measurement signal, can also be ensured.

According to an embodiment, the measuring device is constructed as a two-wire measuring device, in particular as a 4-20 mA two-wire measuring device. Alternatively or in addition, the measuring device has a current regulator, in particular a 4-20 mA current regulator. The measuring device can therefore be supplied with electrical power by means of a supply line and also a measured value and/or the measurement signal can be output in the form of a current value by means of the supply line. In this case, the communication module can be constructed for transmission of the measurement signal on the supply line and/or for wireless transmission of the measurement signal to the communication device. The measuring device can also have a plurality of communication modules, for instance a first module for output of a current correlating with the measurement signal in the supply line and a second module for wireless data transmission, in particular for transmission of the measurement signal, to the communication device.

In particular when the measuring device is constructed as a two-wire measuring device, a supply output and/or supply power can be limited. A construction of a conventional two-wire measuring device is normally designed so that the supply in a network part generates an internal working voltage which supplies subsequent functions or components with power. These functions or components can be, for example, a processor system, an (HF) radar front end, a display module, a status display, a communication module or the like. In order that all these functions or components can operate, in conventional measuring devices a power management is necessary which manages the available power for the individual functions. For this purpose, an energy storage device, for instance a storage capacitor, a battery, or the like, which buffers power provided by means of the supply and enables it to be utilised optimally, is frequently provided in the network part. On the one hand, these energy buffers or energy storage devices can require a significant amount of space on the circuit board and, on the other hand, can give rise to increased costs. In some embodiments of conventional measuring devices, which for instance have a switching state indicator, which can be implemented for example by means of LEDs, and a wireless communication module, such as for example Bluetooth, such an energy storage device can be necessary, since peaks in the power supply for the wireless communication can be collected thereby. Such requirements are absent in the measuring device according to the disclosure.

According to an embodiment, the electrical load has a display module, a switching state indicator and/or a status display. However, in principle the electrical load can be any other electrical load, in particular a load which is not continuously supplied with electrical power during the operation of the measuring device.

According to an embodiment, the measuring device is configured to deactivate the power supply of the electrical load during the transmission time and/or during the data transmission only for a short period of time such that the deactivation is not perceptible to a user of the measuring device, in particular is not visually perceptible to an observer and/or user. In other words, it can be provided that the power supply of the electrical load is temporarily interrupted and/or deactivated during the transmission time in such a way that the interruption is not perceptible to the human eye. For example, the power supply of the electrical load can be deactivated for a maximum of 100 ms, in particular a maximum of 50 ms, for example a maximum of 20 ms, during the transmission time.

According to an embodiment, at least a part of the electrical load is supplied with electrical power with a pulse width modulated signal, which has a succession of low phases and high phases, wherein the power supply of the communication module and the power supply of the electrical load are coordinated in such a way that the communication module is only supplied with electrical power during a low phase of the pulse width modulated signal. For example, the pulse width modulated signal can be a square wave signal with a plurality of pulses or rectangular pulses spaced apart from one another by time intervals, by which the electrical load is supplied with power in a pulsed manner. In particular, the electrical load can have a status display, a switching state indicator and/or a display module. The brightness of the status display, the switching state indicator and/or the display module can be regulated for instance by means of the pulse width and/or the frequency of the pulse width modulated signal, in particular if the electrical load has one or more light-emitting diodes (LEDs). In this case, the operation of the electrical load can be synchronised with the operation of the communication module in such a way that the communication module is operated, activated and/or supplied with power principally and/or exclusively during one or more low phases of the pulse width modulated signal. In this way, sufficient power can always be made available both to the communication module and also to the electrical load. Further components of the measuring device can also be operated analogously on the basis of and/or as a function of the pulse width modulated signal.

According to an embodiment, the measuring device also has a recognition sensor for detecting a user of the measuring device. The recognition sensor can be configured for instance to detect a user located in the vicinity of the measuring device. For example, for this purpose the recognition sensor can be configured to detect a user and/or the presence of a user within a predetermined distance from the measuring device. In this case, the power supply of the electrical load is activated when the recognition sensor detects the user of the measuring device. Upon detection of the user, the recognition sensor can for instance transmit a signal, on the basis of which the power supply of the electrical load can be activated, for instance by actuation of the switching element. In particular when the electrical load has a display module, a status display and/or a switching state indicator, the energy consumption for the electrical load can be reduced to a minimum in this way.

According to an embodiment, the recognition sensor is configured to detect the user based upon a measurement of the distance of the user from the measuring device, based upon a transit time measurement of a recognition signal emitted by the recognition sensor and/or based upon an optical recognition.

A further aspect of the disclosure relates to a method for operating a measuring device as described above and below. The method comprises a step of activating a communication module and/or a power supply of the communication module of the measuring device for data transmission, in particular for output and/or transmission of the measurement signal, during a transmission time. Furthermore, the method comprises a step of deactivating a power supply of the electrical load of the measuring device during at least a part of the transmission time in which the communication module is activated for data transmission, for instance for output of the measurement signal.

Features and elements of the measuring device, as described above and below, can be features, elements and steps of the method as described above and below, and vice versa.

A further aspect of the disclosure relates to a program element which, when executed on a control unit of a measuring device, instructs the measuring device to carry out steps of the method as described above and below.

A further aspect of the disclosure relates to a computer-readable medium on which a program element is stored, as described above and below.

Embodiments of the disclosure are described below with reference to the drawings.

BRIEF DESCRIPTION OF THE DRAWINGS

The drawings are merely schematic and are not to scale. In the drawings, identical, equivalent or similar elements are provided with the same reference numerals.

DETAILED DESCRIPTION OF EMBODIMENTS

Figure 1A:
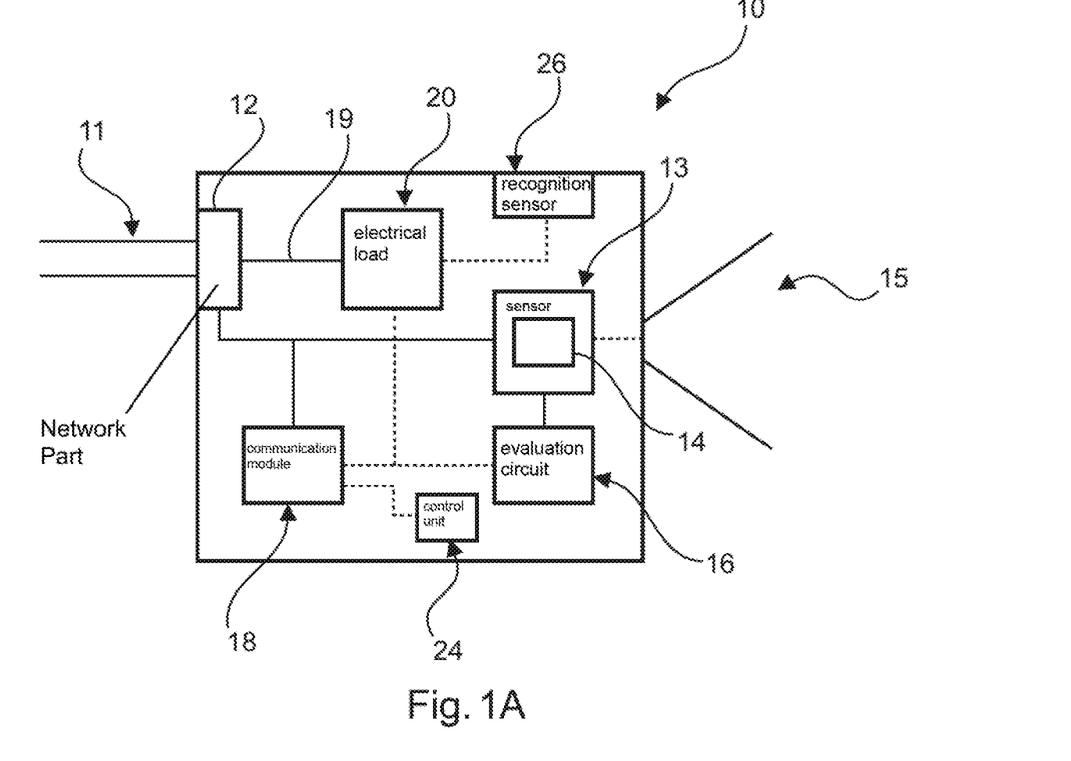
FIG. 1A shows a measuring device according to an embodiment.
Figure 1B:
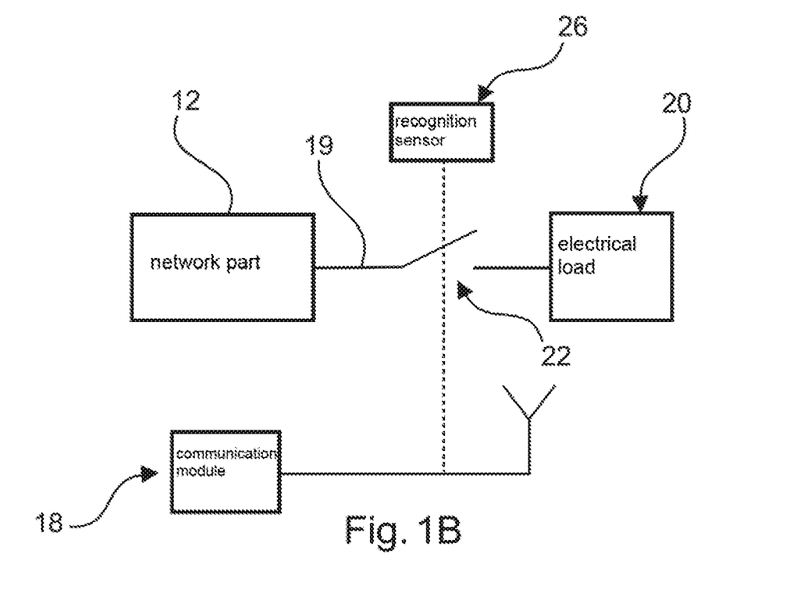
FIG. 1B is a view of a detail of a part of the measuring device according to FIG. 1A.

FIG. 1A shows a measuring device 10 according to an embodiment. FIG. 1B is a view of a detail of a part of the measuring device 10 according to FIG. 1A. The measuring device 10 is designed to determine a process measurement variable, in particular a filling level and/or a limit level of a medium, for instance a medium in a container. Alternatively or in addition, the measuring device 10 in FIGS. 1A and 1B can be designed to determine a pressure of the medium and/or to determine any other process measurement variable.

The measuring device 10 is supplied with electrical power by means of a supply line 11. The supply line 11 can be for instance a two-wire supply 11. Accordingly, the measuring device 10 can be configured as a two-wire measuring device. Coupled to the supply line 11 is a network part 12 which, based upon a supply voltage of the supply line 11, can generate a working voltage for components of the measuring device 10.

The measuring device 10 has a measuring module (sensor) 13 for recording a measured value of the process measurement variable. For example, the measuring module 13 has a radar module (radar) 14 or radar front end 14, by which a transmission signal or radar transmission signal can be generated. The radar module 14 is coupled to an antenna 15, by means of which the transmission signal can be emitted towards the medium by the measuring device 10. At least a part of the transmission signal can be reflected on the medium and/or on a surface of the medium and can be coupled in as a reception signal into the measuring device 10 via the antenna 15.

Alternatively, the measuring module 13 can comprise a pressure measurement cell 14 for recording a pressure of the medium and/or a pressure measurement value, wherein in this case the antenna 15 can be omitted. The measuring device 10 and/or the measuring module 13 can also have both a radar module and also a pressure measurement cell.

Optionally, the measuring device 10 has an evaluation circuit 16 which, based upon the reception signal and/or based upon an evaluation of the reception signal, can generate a measurement signal and/or can determine a measured value. The evaluation circuit 16 can be designed, for example, based upon a transit time method, to determine a distance between the measuring device 10 and the medium and/or a filling level of the medium. The measuring device 10 can also be configured to determine a limit level of the medium.

Alternatively or in addition, the evaluation circuit 16 can be configured to generate a measurement signal which correlates with the pressure measurement value.

Furthermore, the measuring device 10 has a communication module (circuit) 18 which is configured for data transmission to a communication device. The communication device can be for instance a PC, a laptop, a handheld device, a smartphone, a control centre and/or any other terminal device. By means of the communication module 18, it is possible for instance to transmit and/or receive data associated with operating software, firmware and/or documentation, for instance operating instructions, of the measuring device 10. Parameterisation data of the measuring device can also be transmitted and/or received by means of the communication module. Alternatively or in addition, the communication module 18 can be configured to output and/or transmit the measurement signal. In particular, the communication module 18 can be configured for wireless data transmission and/or forwarding of the measurement signal to the communication device during a transmission time in which the communication module 18 is activated for data transmission. For this purpose, the communication module 18 has for instance a Bluetooth module (circuit), a WLAN module (circuit), a wireless module (circuit) and/or an infrared module (circuit).

Furthermore, the measuring device 10 has an electrical load 20 which is supplied with electrical power by means of a supply line 19. The supply line 19 is coupled to the network part 12 for example in FIGS. 1A and 1B. However, it can also be coupled directly to the supply line 11. The electrical load 20 can for example have a display module (display), a switching state indicator and/or a status display. In principle, however, the electrical load 20 can also designate and/or have any other component of the measuring device 10.

A switching element 22 is arranged in the supply line 19 of the electrical load 20. In a first state of the switching element 22, the electrical load 20 is supplied with electrical power, and in a second state of the switching element 22, the power supply of the electrical load 20 is interrupted. Accordingly, the switching element 22 is configured to activate the power supply of the electrical load in the first state and to deactivate it in the second state. In the first state of the switching element 22, the electrical load 20 can be in a working state, and in the second state of the switching element 22, the electrical load 20 can be in a standby state.

In general, the measuring device 10 is configured in order, based upon the switching element 22, to deactivate and/or to reduce the power supply of the electrical load at least during a part of a transmission time (see FIG. 2, 32a-b) in which the communication module 18 is active for data transmission, for instance for output of the measurement signal. In this case, a deactivation of the power supply of the electrical load 20 and an activation of a power supply of the communication module 18 are synchronised with one another. For example, the electrical load 20 can be supplied with power only when the communication module 18 is inactive, and vice versa.

For this purpose, the switching element 20 can be actuated, for example, based upon a status signal of the communication module 18, as illustrated in FIG. 1B. In this case, the status signal can indicate inactivity and/or a standby state of the communication module 18, so that when the status signal is present the switching element 22 can be switched into the first state and the electrical load 20 can be supplied with electrical power. Alternatively, the status signal can indicate activity and/or a transmission state of the communication module 18, and when the status signal is present the switching element 22 can be switched into the second state, so that the power supply of the electrical load 20 can be deactivated and/or interrupted. For example, the communication module 18 can be designed to output the status signal only during the transmission time (32a-b, see FIG. 2) and/or during the output of the measurement signal. In this case, the status signal can be used directly for actuation of the switching element 22, as illustrated schematically in FIG. 1B. Alternatively or in addition, the status signal can be delivered to a control unit 24 and the control unit 24 can be coupled to the switching element 22 and can be configured to switch the switching element 22 into the second state during at least a part of the transmission time 32*a-b*.

The power supply of the electrical load 20 which, in FIGS. 1A and 1B for example has a display module, a status display and/or a switching state indicator, is preferably deactivated during the transmission time 32*a-b* (see FIG. 2) only for a short period of time such that the deactivation is not visually perceptible to an observer, for instance a user of the measuring device 10. For example, the power supply of the electrical load 22 can be deactivated for a maximum of 100 ms, in particular a maximum of 50 ms, preferably a maximum of 20 ms, so that an interruption of the power supply of the electrical load 22 is not perceptible to the human eye.

It is emphasised that further components of the measuring device 10 can also be synchronised analogously to the load 20 and the communication module 18. For example, the measuring device 10 can be configured so that the measuring module 13 (for instance the radar module 14 and/or the pressure measurement cell 14), the communication module 18 and the electrical load 20 are consecutively supplied with electrical power and/or activated. Upon activation of the power supply of one of the measuring module 13 (for instance the radar module 14 and/or the pressure measurement cell 14), the communication module 18 and the electrical load 20, the power supply of the respective other one of the measuring module 13 (for instance the radar module 14 and/or the pressure measurement cell 14), the communication module 18 and the electrical load 20, can be deactivated.

The measuring device 10 optionally has a recognition sensor 26 for detecting a user of the measuring device 10. The recognition sensor 26 can be configured for instance to detect whether the user is located in the vicinity of the measuring device 10 and/or within a predetermined distance from the measuring device 10. The recognition sensor 26 can for instance be configured to output a signal in the presence of the user. Based upon the signal, the switching element 22 can then be actuated and/or switched into the first state, so that the power supply of the electrical load 20 can be activated when the recognition sensor 26 detects the user of the measuring device 10. The recognition sensor 26 can be configured for instance to detect the user based upon a measurement of the distance of the user from the measuring device 10, based upon a transit time measurement of a recognition signal emitted by the recognition sensor 26 and/or based upon an optical recognition.

It can also be provided that the switching element 22 is only switched into the first state in the presence of the status signal of the communication module 18 and in the presence of the signal of the recognition sensor 26, in order to supply the electrical load 20 with electrical power.

An embodiment of the disclosure is summarised below, in which the communication module 18 has a Bluetooth module and/or is designed as a Bluetooth module 18. Furthermore, the electrical load 20 has, for example, a display module with one or more light-emitting diodes (LEDs), also referred to below as an LED display 20. In this case, the LED display 20 is synchronised with the Bluetooth communication and/or measurement signal transmission, for example an advertisement of the Bluetooth module. As a result, it is advantageously possible to dispense with an elaborate power management and/or an energy storage device in the network part 12. This can also be associated with a cost reduction. This can be advantageous in particular when the measuring device 10 is designed as a two-wire measuring device 10. The measurement signal output by means of the Bluetooth module can be transmitted in packet form, that is to say in a plurality of data packets, wherein individual data packets can have a defined temporal length and/or quantity of data. For transmission of such a data packet, only short times in the µs to ms range may be required. In order to avoid a parallel or concurrent activation of the communication module 18 for data transmission and/or measurement signal transmission and activation of the power supply of the LED display 20, the LED display 20 is deactivated during at least a part of the transmission time. As a result, a separate energy storage device can be omitted. In this case, the temporary switching off or deactivation of the LED display 20 or status display 20 (or electrical load 20) can be so short that the human eye does not perceive it. This can be achieved at the moment when the communication module 18 is activated. At this time, the LED display 20 can be deactivated by means of the switching element 22. When it is detected that the communication module 18 transmits a measurement signal, data and/or a data packet, this can be signalled by means of the status signal of the communication module 18 and/or of a Bluetooth controller. A detection of the activated communication module 18 can take place for instance by means of the control unit 24, which then deactivates the electrical load 20 or the LED display 20 by means of the switching element 22.

Figure 2:
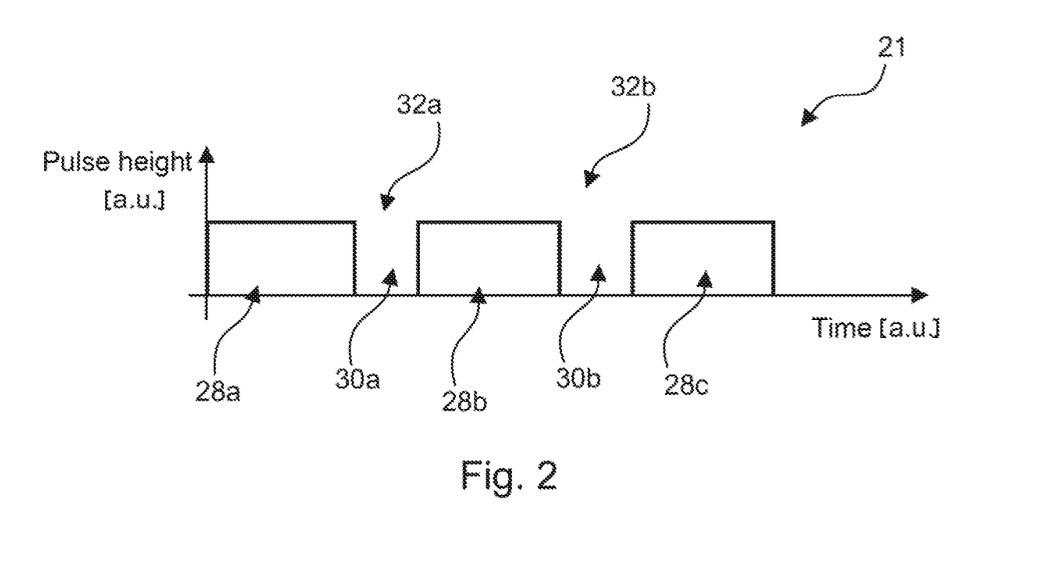
FIG. 2 shows a mode of operation of a measuring device according to an embodiment.

FIG. 2 illustrates a mode of operation of a measuring device 10 according to an exemplary embodiment. Unless described otherwise, the measuring device 10 of FIG. 2 has the same elements and features as the measuring device 10 of FIGS. 1A and 1B.

In the embodiment illustrated in FIG. 2, at least a part of the electrical load 20 is supplied with electrical power by a pulse width modulated signal 21. In FIG. 2, the pulse width modulated signal 21 is illustrated in the form of the pulse height of the signal 21 (in any units) as a function of the time (in any units). The signal 21 and/or the pulses 28*a-c* of the signal 21 have a rectangular shape, for example. Three successive pulses 28*a-c* are illustrated in FIG. 2. Directly successive pulses 28*a-c* are separated chronologically from one another by time periods 30*a-b*. In this case the pulses 28*a-c* can denote high phases 28*a-c* and the time periods 30*a-b* can denote low phases 30*a-b* of the signal 21.

The measuring device 10 is configured to activate the communication module 18 for the data transmission and/or measurement signal transmission during the time periods 30*a-b*. In this way, the transmission and/or output of data, in particular of the measurement signal, can be synchronised with the power supply of the electrical load 20. The power supply of the communication module 18 for data transmission and/or measurement signal transmission and the power supply of the electrical load 20 can be co-ordinated in such a way that the communication module 18 is only supplied with electrical power for data transmission and/or measurement signal transmission during a low phase 30*a-b* of the pulse width modulated signal 21. Accordingly, one of the low phases 30*a-b* or both can denote a transmission time 32*a-b* for data transmission and/or output of the measurement signal by the communication module 18.

This is explained below by way of example with reference to an embodiment. If the load 20 is designed for instance as an LED display 20, a brightness of the LED display 20 can be regulated with the signal 21 and/or based upon the width or duration of the pulses 28*a-c*. Based upon this signal 21, the transmission of the measurement signal, for instance by means of a Bluetooth module, can be synchronised with the signal 21. In this case, the Bluetooth communication and/or the communication module 18 can be activated during one or more low phases 30a-b of the signal 21.

In addition to the synchronisation of the status display 20 and/or LED display 20, other internal functions or components of the measuring device 10 can also be synchronised with the signal 21. The time periods 30a-b in which the status display or LED display 20 is inactive can advantageously be kept short so that this is not visible to the human eye. An example as a limiting value can be, for example, the power supply voltage. The power supply voltage has a frequency of 50/60 Hz. This frequency is high enough, so that the human eye does not perceive the flickering. This means that the status display 20 should not be inactive for longer than 20 ms, for example.

Figure 3:
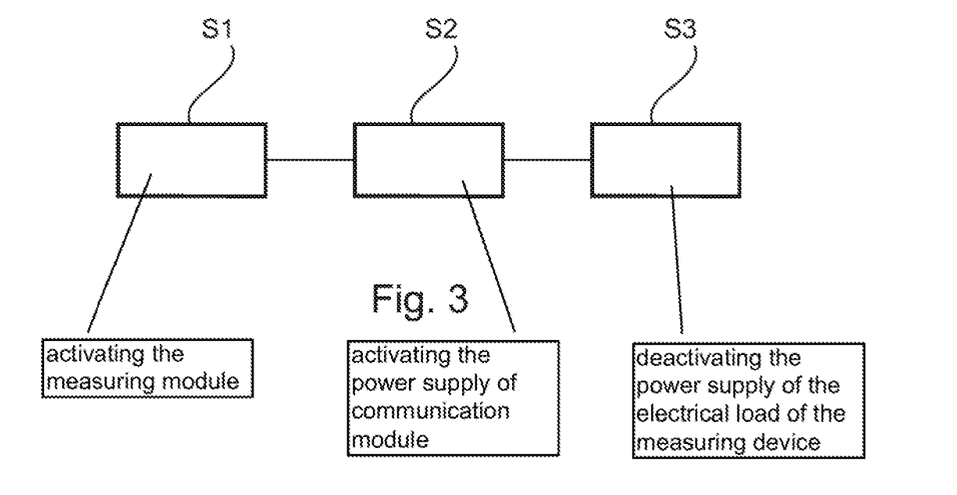
FIG. 3 is a flow diagram for illustration of steps of a method for operating a measuring device according to an embodiment.

FIG. 3 is a flow diagram for illustration of steps of a method for operating a measuring device 10 According to an embodiment. Unless described otherwise, the measuring device 10 has the same elements and features as the measuring devices 10 of FIGS. 1A to 2.

In a step S1, the measuring module 13 (for instance the radar module 14 and/or the pressure measurement cell 14) is activated for recording of a measured value of the process variable. For example, in step S1 a transmission signal can be generated as well as transmitted by the radar module 14. Furthermore, in step S1 the reception signal received and, based thereon, the measurement signal can be determined. Alternatively or in addition, in step S1 a pressure measurement value can be determined by the pressure measurement cell.

In a further step S2, a power supply of the communication module 18 is activated for data transmission, in particular for measurement signal transmission, during a transmission time 32a-b. In a further step S3, the power supply of the electrical load 20 of the measuring device 10 is deactivated during at least a part of the transmission time 32a-b.

In this case, steps S2 and S3 can take place concurrently or one of the steps S2 and S3 can trigger the respective other one.

In addition, it may be pointed out that "comprising" and "having" do not exclude any other elements and the indefinite articles "a" or "an" do not exclude a plurality. Furthermore, it may be pointed out that features which have been described with reference to one of the above embodiments may also be used in combination with other features of other embodiments described above. Reference numerals in the claims are not to be regarded as limitations.

The invention claimed is:

1. A measuring device for determining a process measurement variable including a pressure, a filling level and/or a limit level of a medium, the measuring device comprising:
   at least one measuring sensor configured to record a measured value of the process measurement variable;
   at least one communication circuit configured to transmit a measurement signal correlating with the measured value to a communication device; and
   at least one electrical load which is supplied with electrical power via a supply line of the measuring device,
   wherein a switch configured to activate and deactivate a power supply of the at least one electrical load is arranged in the supply line, and
   wherein the power supply of the at least one electrical load, based on the switch, is deactivated at least during a part of a transmission time, in which the at least one communication circuit is active, and/or at least during a part of a measurement time in which the at least one measuring sensor is active.

2. The measuring device according to claim 1,
wherein the at least one measuring sensor includes a radar circuit configured to transmit a transmission signal towards the medium and to receive a reception signal reflected by the medium, and
wherein the at least on measuring sensor includes an evaluation circuit configured to determine a measurement signal based on the reception signal, the measurement signal correlating with the filling level and/or the limit level of the medium.

3. The measuring device according to claim 1,
wherein the at least one measuring sensor includes a pressure measurement cell configured to record a pressure measurement value.

4. The measuring device according to claim 1,
wherein a deactivation of the power supply of the at least one electrical load and an activation of the at least one communication circuit are synchronised with one another.

5. The measuring device according to claim 1,
wherein the at least one measuring sensor, the at least one communication circuit and the at least one electrical load are supplied in a temporally consecutive manner with electrical power and/or activated.

6. The measuring device according to claim 1,
wherein upon activation of the power supply of one of the at least one measuring sensor, the at least one communication circuit and the at least one electrical load, the power supply of the respective other ones of the at least one measuring sensor, the at least one communication circuit and the at least one electrical load, is deactivated.

7. The measuring device according to claim 1,
wherein the switch is actuated based upon a status signal of the at least one communication circuit, and/or
wherein the measuring device further comprises control circuitry configured to actuate the switch.

8. The measuring device according to claim 1,
wherein the at least one communication circuit is configured for wireless data transmission, and/or
wherein the at least one communication circuit includes a Bluetooth circuit, a wireless circuit, an infrared circuit and/or a WLAN circuit.

9. The measuring device according to claim 1,
wherein the measuring device is a 4-20 mA two-wire measuring device, and/or
wherein the measuring device further comprises a 4-20 mA current regulator.

10. The measuring device according to claim 1,
wherein the at least one electrical load includes a display, a switching state indicator and/or a status display.

11. The measuring device according to claim 1,
wherein the power supply of the at least one electrical load is deactivated during the transmission time such that the deactivation is not visually perceptible to a user of the measuring device.

12. The measuring device according to claim 1,
wherein the power supply of the at least one electrical load is deactivated for a maximum time of 50 ms or 100 ms.

13. The measuring device according to claim 1,
wherein at least a part of the at least one electrical load is supplied with electrical power by a pulse width modulated signal which has a sequence of first phases and second phases, the first phases being lower than the second phases, and
wherein a power supply of the at least one communication circuit and the power supply of the at least one electrical load are co-ordinated in such a way that the at least one communication circuit is only supplied with electrical power and/or activated during a first phase of the pulse width modulated signal.

14. The measuring device according to claim 1, further comprising:
 a recognition sensor configured to detect a user presence of a user,
 wherein the power supply of the at least one electrical load is activated when the recognition sensor detects the user presence.

15. The measuring device according to claim 14,
 wherein the recognition sensor is further configured to detect the user presence based on a measurement of a distance of the user, based on a transit time measurement of a recognition signal emitted by the recognition sensor and/or based on an optical recognition.

16. A method for operating a measuring device for determining a process measurement variable including a pressure, a filling level and/or a limit level of a medium, the measuring device including at least one measuring sensor configured to record a measured value of the process measurement variable, at least one communication circuit configured to transmit a measurement signal correlating with the measured value to a communication device, and at least one electrical load which is supplied with electrical power via a supply line of the measuring device, the method comprising:
 activating one of the at least one communication circuit and/or a first power supply of the at least one communication circuit of the measuring device for data transmission during a transmission time; and
 deactivating a power supply of the at least one electrical load of the measuring device during at least a part of the transmission time.

\* \* \* \* \*